US011534757B2

(12) United States Patent
Moon et al.

(10) Patent No.: US 11,534,757 B2
(45) Date of Patent: Dec. 27, 2022

(54) MICROFLUIDIC DEVICES COMPRISING ELECTROCHEMICAL SENSORS

(71) Applicant: Board of Regents, The University of Texas System, Austin, TX (US)

(72) Inventors: Hyejin Moon, Arlington, TX (US); Ali Farzbod, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 666 days.

(21) Appl. No.: 16/527,859

(22) Filed: Jul. 31, 2019

(65) Prior Publication Data
US 2020/0070161 A1 Mar. 5, 2020

Related U.S. Application Data

(60) Provisional application No. 62/726,737, filed on Sep. 4, 2018.

(51) Int. Cl.
*B01L 3/00* (2006.01)
*G01N 27/416* (2006.01)
(Continued)

(52) U.S. Cl.
CPC ... *B01L 3/502715* (2013.01); *B01L 3/502707* (2013.01); *B01L 3/502784* (2013.01);
(Continued)

(58) Field of Classification Search
CPC ......... B01L 3/502715; B01L 3/502707; B01L 2300/0645; B01L 2300/0681;
(Continued)

(56) References Cited

U.S. PATENT DOCUMENTS

| 6,911,132 B2 * | 6/2005 | Pamula | C25B 9/00 204/600 |
| 9,139,865 B2 * | 9/2015 | Pollack | C12Q 1/6869 |
| 2010/0176006 A1 * | 7/2010 | Bickford | G01N 27/3335 156/60 |

OTHER PUBLICATIONS

Zhou, CN 102095770, machine translation (Year: 2011).*
Yu, CN 103412023, machine translation (Year: 2013).*

* cited by examiner

*Primary Examiner* — Joshua Lallen
*Assistant Examiner* — Caitlyn Mingyun Sun
(74) *Attorney, Agent, or Firm* — John P. Zimmer; Nexsen Pruet, PLLC

(57) ABSTRACT

An electrowetting-on-dielectric (EWOD) microfluidic device comprises at least one integrated electrochemical sensor, the electrochemical sensor comprising: a reference electrode; a sensing electrode; and an analyte-selective layer positioned over the sensing electrode. In some embodiments, the electrochemical sensor measures a concentration of an analyte in a fluid sample exposed to the electrochemical sensor based on a potential difference between the reference electrode and the sensing electrode. The first analyte and the second analyte can be selected from a group consisting of $K^+$, $Na^+$, $Ca^{2+}$, $Cl^-$, $HCO_3^-$, $Mg^{2+}$, $H^+$, $Ba^{2+}$, $Pb^{2+}$, $Cu^{2+}$, $I^-$, $NH_4^+$, $(SO_4)^{2-}$.

19 Claims, 8 Drawing Sheets

(51) Int. Cl.
*G01N 27/403* (2006.01)
*G01N 27/30* (2006.01)
*G01N 27/333* (2006.01)

(52) U.S. Cl.
CPC ......... *G01N 27/301* (2013.01); *G01N 27/333* (2013.01); *G01N 27/4035* (2013.01); *G01N 27/4161* (2013.01); *B01L 2200/12* (2013.01); *B01L 2300/0645* (2013.01); *B01L 2300/0681* (2013.01); *B01L 2300/0887* (2013.01); *B01L 2300/12* (2013.01); *B01L 2300/161* (2013.01); *B01L 2300/165* (2013.01); *B01L 2400/0427* (2013.01)

(58) Field of Classification Search
CPC ........... B01L 2300/12; B01L 2300/165; B01L 2400/0427; B01L 2400/12; G01N 27/301; G01N 27/333; G01N 27/4035; G01N 27/4161; G01N 27/44791
See application file for complete search history.

MICROFLUIDIC DEVICES COMPRISING ELECTROCHEMICAL SENSORS

CROSS-REFERENCE TO RELATED APPLICATIONS

This application claims priority under 35 U.S.C. § 119 to U.S. Provisional Application No. 62/726,737, filed Sep. 4, 2018, the entirety of which is incorporated by reference herein.

STATEMENT REGARDING GOVERNMENT FUNDING

This invention was made with government support under grant no. 1254602 awarded by the National Science Foundation. The government has certain rights in the invention.

FIELD

The invention is generally related to microfluidic devices, and, more specifically, to reconfigurable potentiometric electrochemical sensors on electrowetting on dielectric microfluidic devices.

BACKGROUND

In an electrowetting-on-dielectric (EWOD) digital microfluidic device (DMF), the formation and motion of individual droplets can be controlled by applying an external electric field to designated electrodes within the device. Intricate pump and/or valve systems are thus not needed in such devices to drive and regulate the flow of liquids. In addition, droplets can be individually created and controlled in an EWOD DMF device, thus permitting the multiplexing of many droplets on a two-dimensional surface. Due to these advantages, EWOD DMF devices have been proposed for a variety of applications. However, sensor design has been a limiting factor in creating usable and practical devices for some applications. These problems include immobilization of the sensor, integration of the sensor, reusability of the sensor, sensor size, sensor array design, and many other issues. Therefore, there is a need for improved EWOD DMF devices and sensors.

SUMMARY

A device and an on-chip fabrication method of a ion-selective sensor array enabled by electrowetting on dielectric (EWOD) digital microfluidics is described herein. The electrochemical sensors are seamlessly integrated with sample preparation units in a digital microfluidic platform. As described herein, the on-chip fabrication of a sensor array offers reconfigurable sensors that have longer lifetime in a digital microfluidic platform than conventional sensors. The described devices and methods have many advantages, such as easy automation of sample preparation and detection processes, elongated sensor lifetime, minimal membrane and sample consumption, and a user-definable/reconfigurable sensor array.

In an aspect, an electrowetting-on-dielectric (EWOD) microfluidic device comprises at least one integrated electrochemical sensor, the electrochemical sensor comprising: a reference electrode; a sensing electrode; and an analyte-selective layer positioned over the sensing electrode. In some embodiments, the reference electrode and the sensing electrode are disposed over an electrode of the EWOD device; a top surface of the reference electrode is exposed to a fluid disposed on the electrode of the EWOD device; and a top surface of the analyte-selective layer is exposed to the fluid disposed on the electrode of the EWOD device.

In some cases, the electrochemical sensor is an ion sensor. The electrochemical sensor is a potentiometric sensor in some embodiments. The electrochemical sensor can measure a concentration of an analyte in a fluid sample exposed to the electrochemical sensor based on a potential difference between the reference electrode and the sensing electrode.

In some embodiments, the reference electrode comprises a silver chloride (Ag/AgCl), a calomel ($Hg/Hg_2Cl_2$), an iridium/iridium oxide ($Ir/IrO_2$), a mercury/mercury oxide (Hg/HgO), a mercury/mercurous sulfate ($Hg/Hg_2SO_4$), or a copper/copper(II) sulfate ($Cu/CuSO_4$) electrode. The sensing electrode comprises an electrode member made from a conductive metal or metal alloy, and the analyte-selective layer is positioned over and in direct contact with the electrode member.

The analyte-selective layer is a glass membrane, a resin membrane, or a polymeric membrane. In some embodiments, the analyte-selective layer comprises an ion selective membrane. The ion selective membrane can comprise an ionophore in some instances. Exemplary ionophores include beauvericin, calcimycine cezomycin, carbonyl cyanide m-chiorophenyl hydrazine, enniatin, gramicidin a, ionomycin, lasalocid, monensin, nigericin, nonactin, salinomycin, tetronasin, valinomycin, or narasin. In some cases the ionophore is combined with an ionic liquid. In some instances, the ion selective membrane comprises a polymer.

In some embodiments, an electrowetting-on-dielectric (EWOD) microfluidic device comprises a first parallel plate; the first parallel plate comprises a first substrate, a first set of one or more electrodes positioned over the substrate, and a first dielectric layer positioned over the first set of electrodes and the first substrate, The reference electrode and the sensing electrode can be embedded within the first dielectric layer but are not covered by the first dielectric layer; and the reference electrode and the sensing electrode are in electrical communication with the first set of one or more electrodes of the first parallel plate. In some embodiments, the electrowetting-on-dielectric (EWOD) microfluidic device further comprises a first hydrophobic coating positioned over the first dielectric layer. The first substrate can be formed from a glass, a silicon, a plastic, a polymer, or a paper; the first set of one or more electrodes positioned over the first substrate can be formed from a metal or metal alloy; the first dielectric layer can be formed from a dielectric material; and the first hydrophobic coating can be formed from a polyfluorinated hydrocarbon.

In some embodiments, the reference electrode is disposed in a reference electrode borehole extending through the first dielectric layer and the first hydrophobic coating to the first set of electrodes positioned over the first substrate; and the sensing electrode is disposed in a sensing electrode borehole extending through the first dielectric layer and the first hydrophobic coating to the first set of electrodes positioned over the first substrate.

An electrowetting-on-dielectric (EWOD) microfluidic device described herein can further comprise a second parallel plate in facing opposition to the first parallel plate; and a gap between the first and second parallel plates. In some instances, the second parallel plate comprises a second substrate, a second set of one or more electrodes positioned over the second substrate, and a second dielectric layer positioned over the second set of electrodes and the second substrate. The second substrate can be formed from a glass, a silicon, a plastic, a polymer, or a paper. The second set of electrodes can be formed from a metal or metal alloy. The second dielectric layer can be formed from a polyfluorinated hydrocarbon.

In some embodiments, an electrowetting-on-dielectric (EWOD) microfluidic device comprises a plurality of integrated electrochemical sensors. For example, in some instances, the device comprises a first electrochemical sensor including a first analyte-selective layer that is selective for a first analyte; and a second electrochemical sensor including a second analyte-selective layer that is selective for a second analyte.

In some cases, the first analyte and the second analyte differ. In some embodiments, the first analyte and the second analyte are selected from a group consisting of $K^+$, $Na^+$, $Ca^{2+}$, $Cl^-$, $HCO_3^-$, $Mg^{2+}$, $H^+$, $Ba^{2+}$, $Pb^{2+}$, $Cu^{2+}$, $I^-$, $NH4^+$, and $(SO_4)^{2-}$.

In another aspect, a method of making an integrated electrochemical sensor in an electrowetting-on-dielectric (EWOD) microfluidic device comprises electroplating an electrode metal into a reference electrode receiving space of the EWOD device; electroplating the electrode metal into a sensing electrode receiving space of the EWOD device; chemically oxidizing a portion of the electroplated metal in each of the reference electrode receiving space and the sensing electrode receiving space to form an oxidized metal layer over a residual metal layer in each of the reference electrode receiving space and the sensing electrode receiving space; and depositing an analyte-selective layer on the oxidized metal layer in the sensing electrode receiving space.

DETAILED DESCRIPTION

Figure 1:
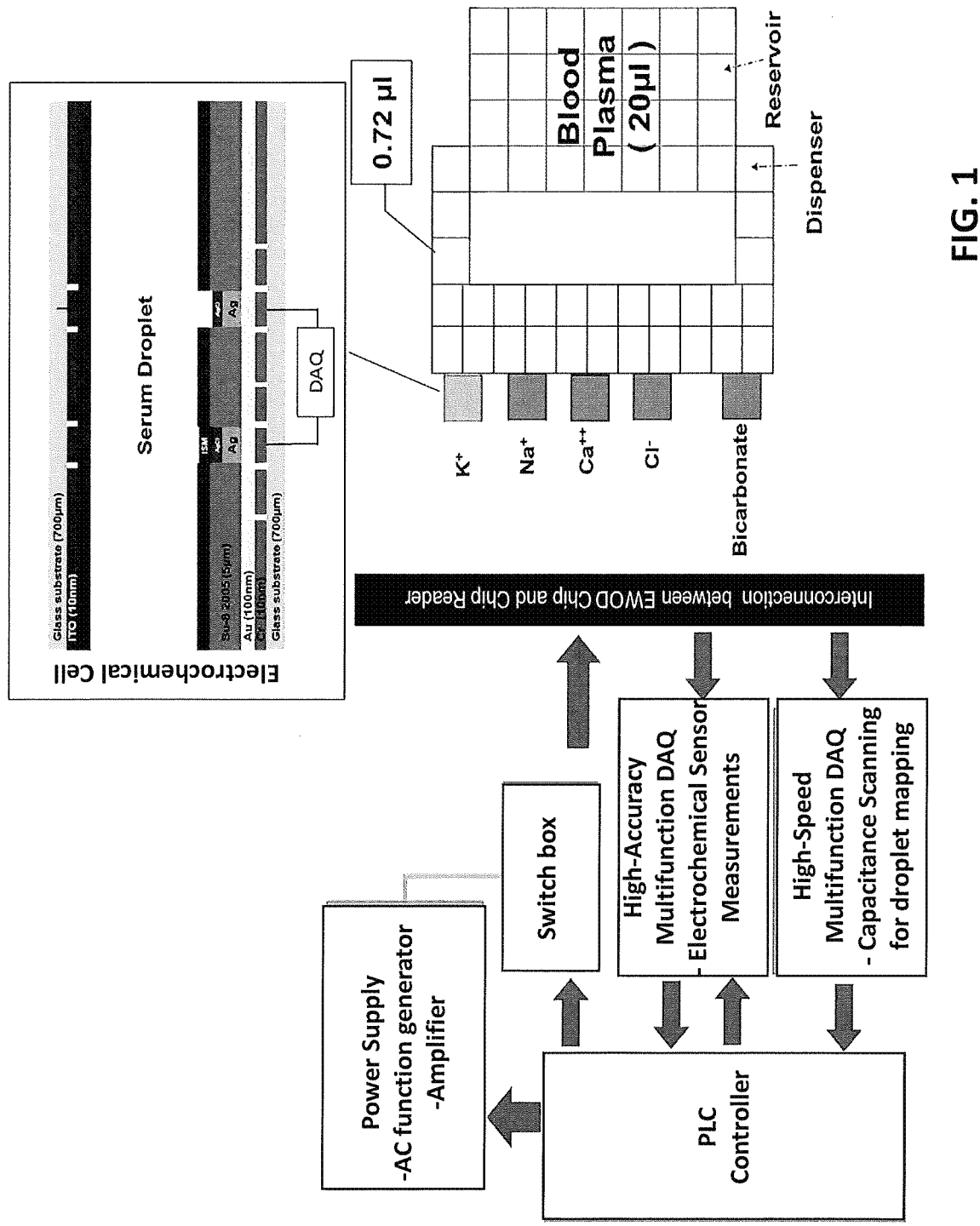
FIG. 1 is a schematic illustration of a method of sensing, detecting, or measuring the concentration of one or more analytes using an EWOD DMF described herein.

All ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. EWOD Microfluidic Devices

EWOD digital microfluidic devices (DMF) are described herein, which, in some embodiments, address one or more of the problems related to conventional EWOD DMF devices. DMF devices described herein can be "closed," "parallel plate," or "two-sided" devices, as opposed to "open" or "single-sided" devices. Thus, in some cases, a DMF device described herein can comprise a first parallel plate, a second parallel plate in facing opposition to the first parallel plate, and a gap between the first and second parallel plates. Fluid droplets can be formed and/or manipulated in the gap while in contact with the first and/or second parallel plate. Moreover, the first and/or second parallel plate can comprise a substrate, electrical contacts or electrodes positioned on or over the substrate, a dielectric layer positioned over the electrodes and substrate, and, in some cases, a hydrophobic coating positioned on the dielectric layer. A droplet disposed between the plates can be in contact with the topmost layer, such as the dielectric layer or hydrophobic coating, of each plate. Further, the spatial position of the electrodes in a parallel plate EWOD device described herein can define, form, or determine functional components of the device. For example, the placement of electrodes in a parallel plate device can form droplet-dispensing components, droplet-splitting components, bioassay components, reaction components, and other components, as described further herein.

In an embodiment, an EWOD DMF device described herein has at least one integrated electrochemical sensor. However, such an EWOD DMF device is not limited to only one integrated electrochemical sensor, but in some instances can comprise a sensor array including a plurality of integrated electrochemical sensors.

In an aspect, each electrochemical sensor (whether the device comprises one electrochemical sensor or a plurality of electrochemical sensors) can include a reference electrode, a sensing electrode, and an analyte-selective layer positioned over the sensing electrode. In some embodiments, the reference electrode and the sensing electrode can be disposed over or within an electrode of the EWOD device in an integrated form.

EWOD DMF devices described herein, in some instances, can perform several different functions. For example, devices described herein can hold analyte-containing samples and sensor precursor materials in various reservoirs. The device can also move the analyte-containing samples and sensor precursor materials from these reservoirs to the electrochemical sensor through EWOD microfluidic actuation. Through the movement of the sensor precursor materials to the electrochemical sensor, the reference electrode, sensing electrode, and analyte-selective layers can be made in situ on the electrochemical sensor. Moreover, when the analyte-containing sample fluid is moved to the electrochemical sensor, a top surface of the reference electrode can be exposed to the fluid. A top surface of the analyte-selective layer can also be exposed to the fluid, and a concentration of analyte in the analyte-containing sample fluid can be determined, as described further hereinbelow. That is, certain sensor components (especially "top" or "fluid facing" surfaces of the reference and sensing electrodes) can have direct contact with an analyte fluid or sample. It is further to be understood that such direct contact can occur when there is no dielectric layer or hydrophobic layer or other similar layer of the EWOD device disposed on, over, or in direct contact with such sensor components (again, especially "top" or "fluid facing" surfaces of the reference and sensing electrodes). By integrating one or more electrochemical sensors (including in a manner described above) with an EWOD DMF device, certain advantages over other devices can be obtained, such as the ability to use small sample sizes.

Another advantage of in situ electrochemical sensor formation described herein is the following. One or more electrochemical sensors can be reconfigured and/or reused, including without rebuilding the device and possibly also during the course of continuous EWOD operation. For example, in some embodiments, one or more analyte-selective layers can be removed by rinsing with an appropriate solvent using EWOD microfluidic action, and then one or more sensors can be "rebuilt" to the desired sensor type (which may be the same or different than the original sensor type). Such "rebuilding" can be carried out by reforming an analyte-selective layer in the same location, including in a manner described herein. Alternatively, or in addition to rinsing, a new pair of reference and sensing electrodes can be made on a different electrochemical sensor location rather than reusing the same, previously existing sensor location.

Electrochemical sensor designs described herein, in some embodiments, also permit on-chip calibration of the sensor, which is advantageous for practical uses in a clinical or home setting. As understood by one of ordinary skill in the art, for any sensor, calibration is needed for accuracy of that sensor, because a "raw" signal correlating to an analyte will vary from sensor to sensor (of the same type) for the same analyte. Thus, each sensor can be calibrated before use. Many existing commercial sensors are typically calibrated when manufactured, prior to incorporating the sensors into another system or prior to sale to an end user. In this disclosure, when the electrochemical sensors are made in situ, the calibration can be performed in situ also, using the microfluidic functionality of the EWOD DMF device. For example, in some instances, for each analyte there can be an on-chip reservoir of a high concentration stock solution of the analyte. There can also be a large reservoir of water or an appropriate solvent as a diluent. To calibrate a given sensor before use, a desired number of known concentration droplets (e.g., n droplets to form a calibration curve with n data points) can be formed by mixing appropriate amounts of the stock solution and water (or other solvent/diluent). These known concentration droplets can then be used to calibrate the sensor before the analyte sample is moved to the sensor.

Turning again in more detail to the individual components of EWOD DMF devices described herein, it is to be understood that, in some embodiments, the electrochemical sensor of a device described herein can be a potentiometric sensor. Such a sensor can more particularly be an ion sensor. A role of a potentiometric electrochemical sensor described herein, in general, is to measure a concentration of an analyte in a fluid sample exposed to the electrochemical sensor based on a potential difference between the reference electrode and the sensing electrode. The analyte comprises, in some instances, a biologically relevant analyte, such as potassium ion, sodium ion, calcium ion, chloride ion, bicarbonate ion, or any other biologically relevant analyte. However, the analyte is not limited to just biologically relevant analytes. Devices and methods described herein can also be used to detect or measure the concentration of analytes relevant in other contexts, such as industrial processes, environment applications, and the like. The analyte is not particularly limited. It is instead to be understood that the electrochemical sensor for a given or desired analyte has a structure (e.g., an analyte-selective layer or other analyte-specific feature) that corresponds to or is selected based on the desired analyte.

In some cases, the reference electrode of a sensor described herein is a redox-based electrode. In some instances, the reference electrode comprises a silver chloride (Ag/AgCl), a calomel (Hg/Hg$_2$Cl$_2$), an iridium/iridium oxide (Ir/IrO$_2$), a mercury/mercury oxide (Hg/HgO), a mercury/mercurous sulfate (Hg/Hg$_2$SO$_4$), or a copper/copper(II) sulfate (Cu/CuSO$_4$) electrode. Any other redox-based electrode not inconsistent with the objectives of this disclosure may also be used. In certain preferred embodiments, the electrode is a silver chloride electrode.

Similarly, the sensing electrode of a sensor described herein can be formed from any material or have any structure not inconsistent with the objectives of this disclosure, such as a metal or metal alloy. In some cases, for instance, the sensing electrode comprises a silver chloride (Ag/AgCl) electrode or any other suitable sensing electrode material, such as those described for the reference electrode. Moreover, the sensing electrode and the reference electrode, in some embodiments, are formed from the same materials and have the same structures, except for materials and/or components of the sensing electrode that may be needed to provide analyte-specific or analyte-selective sensing. In some cases, use of the same material for the sensing electrode as the reference electrode simplifies the manufacturing process, although for purposes of functionality, any suitable electrode-forming material can be used.

In some cases, the analyte-selective layer of a sensing electrode described herein comprises a glass membrane, a resin membrane, a polymeric membrane, or any other analyte-selective material not inconsistent with the objectives of this disclosure. In some instances, the analyte-selective layer is an ion selective membrane comprising an ionophore. The ionophore can comprise beauvericin, calcimycine cezomycin, carbonyl cyanide m-chlorophenyl hydrazine, enniatin, gramicidin a, ionomycin, lasalocid, monensin, nigericin, nonactin, salinomycin, tetronasin, valinomycin, narasin, or other similar ionophores. In some instances, the ion selective membrane also comprises a polymer.

In some embodiments, the analyte-selective layer is an ionic liquid, either individually or in combination with a polymer, membrane, or an ionophore. It has been observed that the presence of an ionic liquid in a polymer, membrane, or an ionophore can form an ion- or analyte-selective layer on an electrode. Particularly, the presence of the ionic liquid increases the ion-exchange capacity and ion diffusivity of the polymer/membrane/ionophore. Any suitable ionic liquid not inconsistent with the objectives of this disclosure can be used. For example, ionic liquids described herein can comprise an organic cation that is imidazolium-based, pyridinium-based, pyrrolidinium-based, phosphonium-based, ammonium based, sulfonium-based, or any combination thereof. The ionic liquid can further comprise an anion that is an alkylsulfate, tosylate, methansulfonate, trifluoromethanesulfonate (triflate), bis(trifluoromethylsulfonyl)imide, tetrafluoroborate, hexafluorophosphate, a halide, or an combination thereof. In some embodiments, a low-melting ionic solid (LMIS) can be used as a sensing material in the analyte-selective layer for potentiometric detection of different analytes. For instances, a tridazole-based ionic liquid can be used to form an iodide-selective layer, and a $Cu^{2+}$- selective layer can be formed using 1-ethyl-3-methyl imidazolium chloride. Further exemplary ion-selective electrodes and analyte-selective layers based on ionic liquids are described in Joaquin A. Ortuno et al.; Ionic Liquids in Separation Technology; Chapter 9—Ion-Selective Electrodes based on Ionic Liquids (2014) pages 275-299, the entirety of which is incorporated by reference herein.

Additionally, EWOD DMF devices described herein, in some cases, have a first parallel plate comprising a first substrate, a first set of one or more electrodes positioned over the substrate, and a first dielectric layer positioned over the first set of electrodes and the first substrate. Further, in some instances, a first hydrophobic coating is positioned over the first dielectric layer. The reference electrode and the sensing electrode can be integrated into the first set of one or more electrodes by being embedded within the first dielectric layer, but not being covered by the first dielectric layer.

In some embodiments, the reference electrode of a sensor described herein is disposed in a reference electrode borehole extending through the first dielectric layer and the first hydrophobic coating to the first set of electrodes positioned over the first substrate; and the corresponding sensing electrode is disposed in a sensing electrode borehole extending through the first dielectric layer and the first hydrophobic coating to the first set of electrodes positioned over the first substrate. In some cases, one or both of the reference electrode borehole and the sensing electrode borehole is positioned in an approximate center of the electrochemical sensor. However, in other instances, one or both boreholes are positioned off-center of the electrochemical sensor. Both the reference electrode and the sensing electrode are in electrical communication with the first set of one or more electrodes of the first parallel plate.

A substrate of a device described herein can be formed from any material not inconsistent with the objectives of this disclosure. For example, in some cases, the first substrate is formed from glass. Other components may also be formed from any material or combination of materials not inconsistent with the objectives of this disclosure. For instance, the first set of one or more electrodes positioned over the first substrate can be formed from a metal, metal mixture, or metal alloy. In some instances, the first set of electrodes form a seed layer for subsequent electroplating steps, and can be made from gold or a gold alloy, chromium or chromium alloy, titanium, a nickel or nickel alloy, or any other suitable electrode material. Similarly, any suitable dielectric material and any suitable hydrophobic coating material can be used in an EWOD device described herein. For example, the first dielectric layer can be formed from a dielectric materials, such as a positive or a negative photoresist material. Exemplary dielectric materials include ceramics such as silicon dioxide ($SiO_2$) and silicon nitride ($Si_3N_4$); polymers such as an epoxy-based photoresist; poly(p-xylylene) polymers such as a Parylene™, or other dielectric materials known to the skilled artisan. Likewise, the first hydrophobic coating can be formed from a polytetrafluoroethylene, such as commercially available Teflon™, FluoroPel™, CYTOP™, and the like, or other polyfluorinated hydrocarbons known to the skilled artisan.

In some embodiments, the EWOD DMF device further comprises a second parallel plate positioned in facing opposition to the first parallel plate; where a gap is formed between the first and second parallel plates. The second parallel plate can comprise a second substrate, a second set of one or more electrodes positioned over the second substrate, and a second dielectric layer positioned over the second set of electrodes and the second substrate.

Like the first substrate, the second substrate can be formed from glass or any other suitable substrate material. Similarly, the second set of one or more electrodes positioned over the second substrate can be formed from a metal, metal mixture, or metal alloy, conductive ceramic, or any another electrically conductive material known to the skilled artisan. For example, the second set of electrodes can be formed from optically transparent indium tin oxide (ITO). The second dielectric layer can be formed from a polytetrafluoroethylene or other polyfluorinated hydrocarbon, or any other suitable dielectric material as previously discussed for the first dielectric layer.

In some embodiments, EWOD DMF devices described herein comprise a plurality of integrated electrochemical sensors, such as an array of integrated electrochemical sensors. The array of integrated electrochemical sensors can be used to detect a plurality of different analytes using the same EWOD DMF device.

For example, in some embodiments, the EWOD DMF device comprises a first electrochemical sensor and a second electrochemical sensor. The first electrochemical sensor can comprise a first analyte-selective layer that is selective for a first analyte, and the second electrochemical sensor can comprise a second analyte-selective layer that is selective for a second analyte; where the first analyte and the second analyte are different. When an analyte-containing fluid is moved from a reservoir to the first and second electrochemical sensor and contacts the first and second analyte-selective layers, each of the first and second electrochemical sensors can determine a concentration of an analyte present in the analyte-containing fluid, the particular analyte being determined by the composition of the electrochemical sensor's respective analyte-selective layer. The EWOD DMF device is not limited to only two electrochemical sensors, but can also comprise n electrochemical sensors comprising n analyte-selective layers selective for n differing analytes, where n is 3 or greater. As described above, the n differing analytes can include $K^+$, $Na^+$, $Ca^{2+}$, $Cl^-$, $HCO_3^-$, $Mg^{2+}$, $H^+$, $Ba^{2+}$, $Pb^{2+}$, $Cu^{2+}$, $I^-$, $NH4^+$, $(SO_4)^{2-}$, or any other analytes not inconsistent with the objectives of this disclosure.

II. Methods of Making an EWOD Device

In another aspect, methods of making an integrated electrochemical sensor in an EWOD DMF device are disclosed. The EWOD device can particularly be a device described in Section I herein. In some embodiments, such a method comprises electroplating an electrode metal into a reference electrode receiving space of the EWOD device; electroplating the electrode metal into a sensing electrode receiving space of the EWOD device; chemically oxidizing a portion of the electroplated metal in each of the reference electrode receiving space and the sensing electrode receiving space to form an oxidized metal layer over a residual metal layer in each of the reference electrode receiving space and the sensing electrode receiving space; and depositing an analyte-selective layer on the oxidized metal layer in the sensing electrode receiving space.

The electroplated electrode metal can comprise silver, mercury, iridium, copper, or any other suitable electrode metal not inconsistent with the objectives of this disclosure. In one embodiment, the electroplated electrode metal is Ag, and hydrochloric acid is used to chemically oxidize a portion of the electroplated Ag to form AgCl (such as a surface of the electroplated Ag), with the residual metal layer being Ag.

Additionally, in some instances, electroplating the electrode metal into the reference electrode receiving space comprises transferring a metal-containing electroplating solution from a first reservoir of the EWOD DMF device to the reference electrode receiving space through electrowetting-on-dielectric microfluidic actuation. Electroplating the electrode metal into the sensing electrode receiving space can be performed in a manner similar to that of the reference electrode, where a metal-containing electroplating solution is transferred from a first reservoir of the EWOD device to the sensing electrode receiving space through electrowetting-on-dielectric microfluidic actuation.

Similar to the electroplating of the electrode metal, the chemical oxidation of the electroplated metal in the reference electrode receiving space and the sensing electrode receiving space can also be performed using microfluidic actuation. For example, in some cases, chemical oxidation is carried out by transferring an oxidizing agent solution from a second reservoir of the EWOD DMF device to the reference electrode receiving space and the sensing electrode receiving space through electrowetting-on-dielectric microfluidic actuation. In such instances, the electroplated metal in the reference electrode receiving space and the sensing electrode receiving space is contacted with the oxidizing agent solution and the surface of the electroplated metal is oxidized.

Likewise, in some embodiments, the analyte-specific layer of a sensor described herein is carried out using microfluidic actuation. In some cases, for instance, depositing or forming an analyte-specific layer comprises transferring a membrane precursor-containing solution from a third reservoir of the EWOD DMF device to the sensing electrode receiving space through electrowetting-on-dielectric microfluidic actuation. The solvent is then evaporated, leaving an analyte-specific layer covering a surface of the sensing electrode. The composition of the analyte-specific layer is described above in Section I, and specific embodiments are described below in the EXAMPLES.

III. Methods of Sensing, Detecting, or Measuring Analytes and/or Analyte Concentrations In still another aspect, methods of sensing, detecting, or measuring the concentration of one or more analytes are described herein. Such a method can be carried out with an EWOD DMF device of Section I above. A method of Section II can also be used in carrying out a sensing method described in this Section III.

For example, in some embodiments, a method of sensing, detecting, or measuring described herein comprises transferring an analyte-containing solution from a reservoir of a microfluidic device described herein to the electrochemical sensor of the device through electrowetting-on-dielectric microfluidic actuation. Such a method further comprises contacting the reference electrode and the analyte-selective layer of the sensor with the analyte-containing solution. In some cases, the method also comprises determining an analyte concentration in the analyte-containing solution based on a potential difference between the reference electrode and the sensing electrode.

Moreover, in embodiments where the EWOD DMF device comprises a plurality of electrochemical sensors having different analyte-selective layers, such as n electrochemical sensors and n different analyte-selective layers, the analyte-containing solution can be transferred from the reservoir to each of the plurality of electrochemical sensors through electrowetting-on-dielectric microfluidic actuation. In such instances, the reference electrode and the analyte-selective layer of each electrochemical sensor is contacted with the analyte-containing solution. In some cases, the analyte-selective layer of each electrochemical sensor is selective for a different analyte than the analyte-selective layers of the other electrochemical sensor pairs, allowing for detection and concentration determination of the different analytes in the analyte-containing solution.

One non-limiting example of a method described herein is illustrated schematically in FIG. 1.

The embodiments described herein can be understood more readily by reference to the following EXAMPLES. Elements, apparatus and methods described herein, however, are not limited to the specific embodiments presented in the EXAMPLES. It should be recognized that these sections describe embodiments and examples that are merely illustrative of the principles of this disclosure. Numerous modifications and adaptations will be readily apparent to those of skill in the art without departing from the spirit and scope of the disclosure.

In the following EXAMPLES, methods and devices described herein integrate ion-selective potentiometric sensors into the EWOD DMF platform. As the proof-of-concept model system, polymer-based potassium selective electrodes are fabricated. To complete the sensor fabrication, the liquid handling capability of EWOD DMF is actively utilized, which is described as "on-chip fabrication of sensors." This new method of fabrication allows not only seamlessly integrating sensors with the sample preparation platform, but also reconfiguring sensors on demand without any interruption or the disassembling of the device. Moreover, this method ensures the lifetime of reference electrodes in sensors by redepositing the Ag/AgCl layer on-chip. The following examples demonstrate exemplary methods of on-chip fabrication of a sensor and a sensor array.

Example 1

EWOD Chip Fabrication

A gold (Au, 1000 Å)/chromium (Cr, 100 Å) coated glass wafer was used to fabricate the integrated device. Metal layers (Au/Cr) were used for the seed layer of ion-selective electrodes as well as for EWOD electrodes. 51813 (MICROPOSIT) was used as the photoresist for the photolithography and etching mask layers in different stages of fabrication. SU-8 2005 (Micro-Chem) was used as the dielectric layer of EWOD device. Teflon AF1600S (Du Pont) powder dissolved in the Fluorinert FC-40 (Sigma-Aldrich) for creating a 4 wt. % solution used to spin coat the hydrophobic layer of EWOD device. 1025 RTU @4.5 TROY/GALLON (TECHNIC INC) was used as the silver (Ag) electroplating solution. Hydrochloric acid (HCl) analytical reagent grade was used for the formation of the AgCl layer.

Technics Micro-RIE Series 800 Plasma System was used to selectively etch and modify the surface properties of the Teflon layer. Electromotive force (EMF) was measured with a high input impedance ($10^{12}\Omega$) by HP 34401A Multimeter at room temperature (21° C.) in the electrochemical cell fabricated on the chip.

Figure 2A:
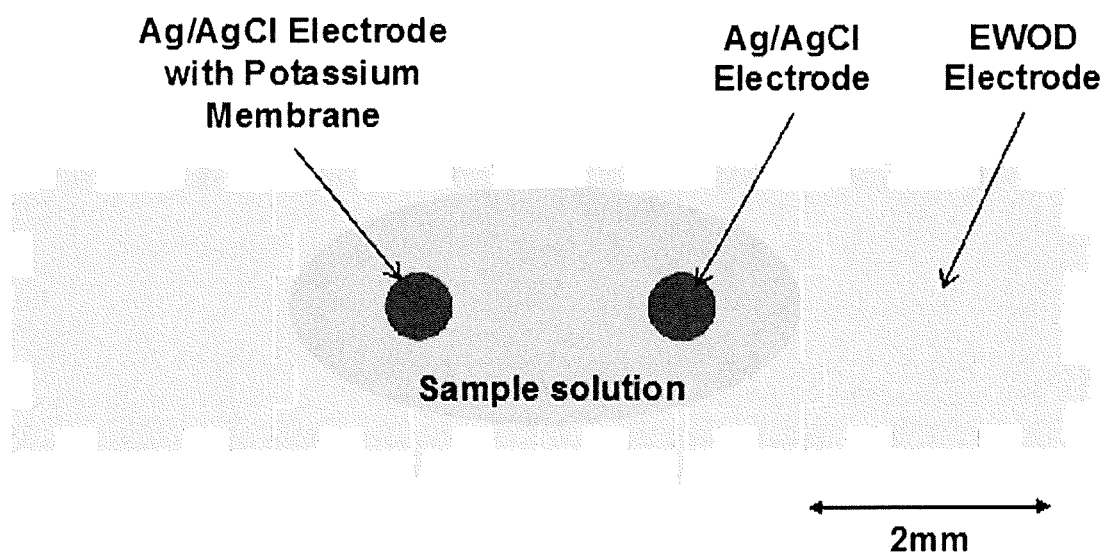
FIG. 2A is a top view of an EWOD electrochemical cell.
Figure 2B:
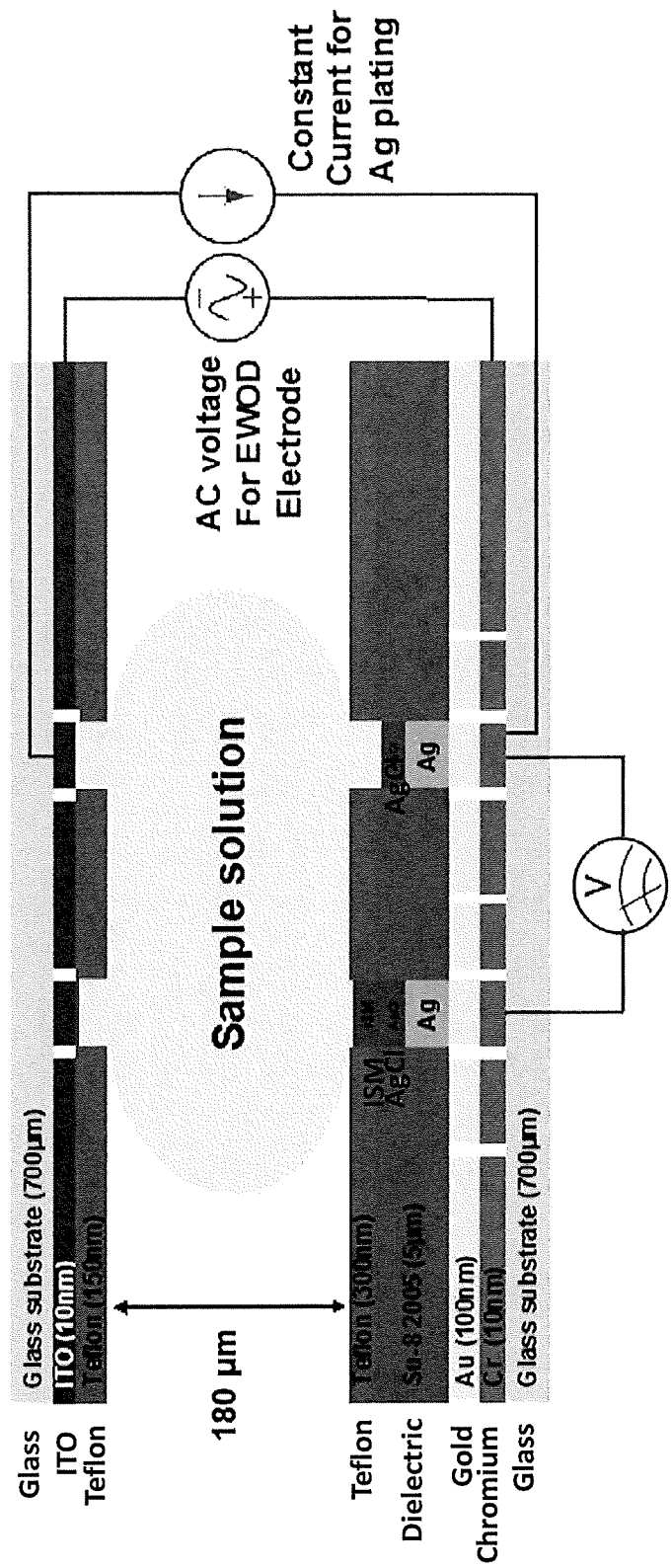
FIG. 2B is a cross-sectional view of the EWOD electrochemical cell of FIG. 2A and the expanded box in FIG. 1.

FIGS. 2A and 2B show a top view and a cross-sectional view of the EWOD electrochemical cell. The top plate is a glass substrate coated with indium tin oxide (ITO) layer that serves as a ground electrode for EWOD operation as well as a cathode electrode for electroplating of Ag. The bottom chip contains a patterned gold layer that serves as EWOD electrodes and the seed layer of potentiometric sensor electrodes. Although using Au electrodes as non-corroding metal is common to cyclic voltammetric and amperometric sensors, a potentiometric electrochemical sensor requires a redox couple to maintain a stable potential and to provide accurate voltage measurement during voltage measurements. An Ag/AgCl reference electrode that contains saturated standard solution can provide long-term stability for electrochemical sensors, but integrating such reference electrode in a lab-on-a-chip (LOC) system results in a much more expensive and complicated system and does not fit for portable devices. As described herein, fabrication of solid-state Ag/AgCl electrodes through electroplating and chemical anodization is described herein, where the electroplated electrode forms a quasi-bulk phase, allows for the subsequent formation of a much thicker silver chloride while having a much rougher surface. This leads a larger and electrochemically active surface area with higher stability where electromotive force, i.e., voltage, measurements can be achieved. The short lifetime problem has been reduced or eliminated using the sensor platform described herein in which Ag/AgCl electrodes are fabricated on demand using EWOD DMF liquid handling capability rather than to have a platform containing ready-made sensor elements.

To dispense and locate droplets of required reagents, six reservoirs where each reagent is held and dispensed as a ~650 nL droplet, and 45 EWOD actuating electrodes (2×2 $mm^2$ each) are placed in the platform. Entire platform layout can be found in section 2.2.4. As for the potassium selective sensor array, four electrochemical cells were designed where the sensor electrode (circular shape with 400 μm diameter) is placed in the middle of an EWOD electrode. The ratio between an EWOD actuating electrode and the sensor electrode (i.e., the hydrophilic-to-hydrophobic ratio) plays a role in the movability of the droplets in the sensing sites. In this embodiment, 3.1% was chosen as the ratio to ensure the maximum level of movability while having enough hydrophilic area for pinching off the ion-selective membrane solution during the on-chip fabrication of sensors of which details are discussed in the next section.

Figure 3:
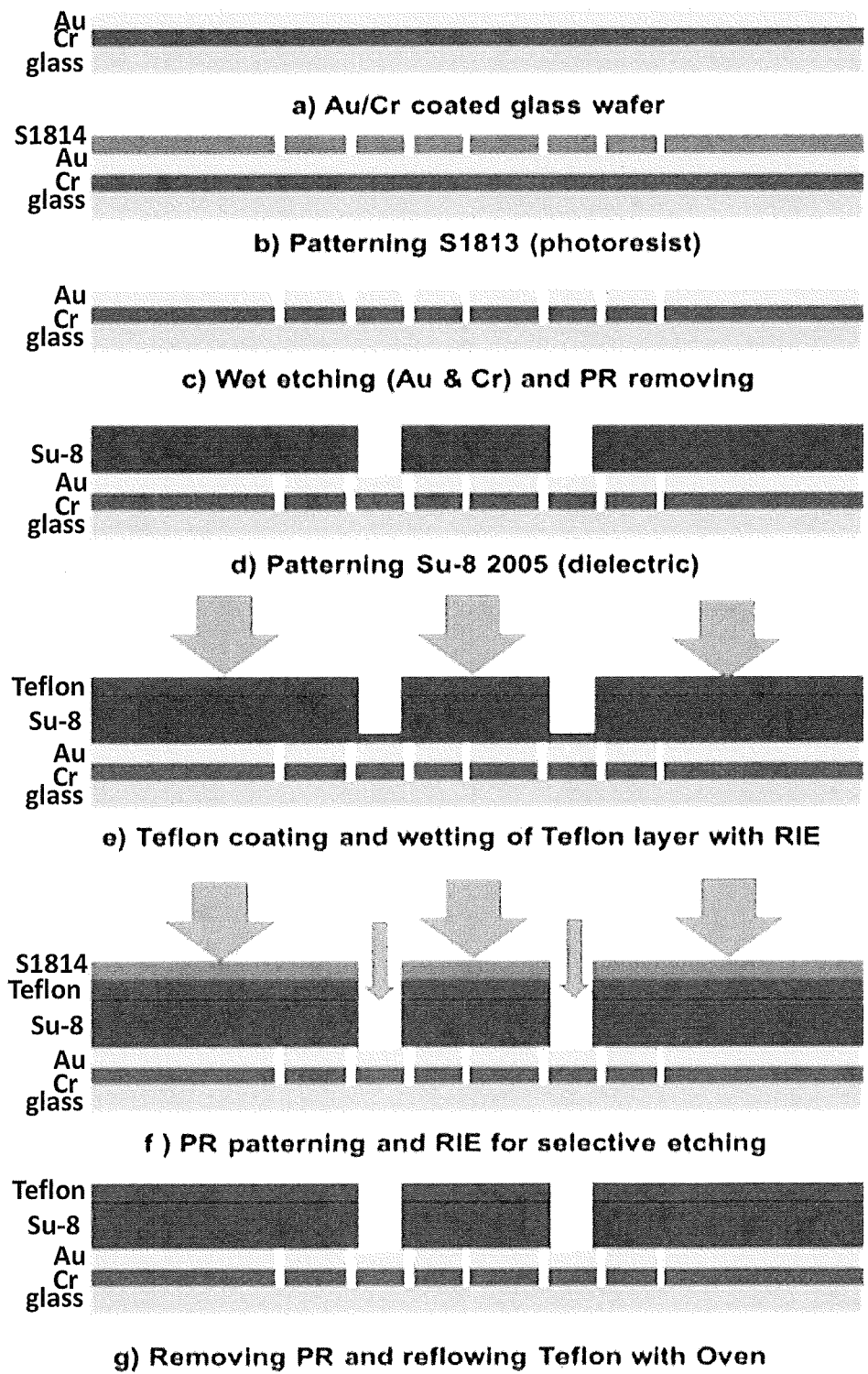
FIG. 3 is a fabrication process of a bottom chip of an EWOD DMF device described herein.

Fabrication steps of a bottom chip in an EWOD DMF chip are detailed are shown in FIG. 3. In a subsequent EXAMPLE, the on-chip fabrication steps of the sensor electrodes in the EWOD DMF chip will be discussed. Gold and chromium coated glass wafers of the EWOD device and the sensor electrode were patterned by standard photolithography, followed by wet chemical etching of the Au/Cr layer. SU-8 2005 (a negative photoresist) was then spin coated and photolithographed to form a dielectric layer over the EWOD electrodes with a thickness of 5 μm. Afterward, a Teflon layer (~300 nm) was spin coated and baked to form a hydrophobic surface. To etch the Teflon layer on top of the sensor electrode, the desired Teflon layer was masked. To do so, the Teflon surface was treated for 5 seconds with 140 W of power at an argon rate of 30 sccm by reactive ion etching (RIE) to make the surface ready for the spin coat of S1813, a positive photoresist needed for forming the RIE etching mask. After selectively etching the Teflon layer over the sensor electrodes for 230 seconds by RIE with the power of 160 W at the same argon rate, the layer was exposed to UV light (flood exposure) to weaken the remaining photoresist and was removed by dissolving it in an acetone solution. Finally, after placing the chip in an oven at 200° C. for one hour, the Teflon surface recovered its hydrophobic properties and got ready for EWOD operation.

As for the top chip of an EWOD DMF shown in FIG. 2B, the fabrication started with patterning ITO layer using photolithography method. S1813 was used as photoresist and MF-319 as developer solution. The photoresist patterning process followed by wet etching in ITO etchant (8:1:15 vol % HCl:HNO3:H2O) for 165 seconds. After dehydrating the patterned ITO wafer, the same process mentioned above was used to pattern Teflon selectively to creates the openings for ITO electrode to work as the cathode at the time of electroplating while keeping Teflon layer on other areas which function as the ground electrode for operating EWOD DMF.

Example 2

On-Chip Fabrication of a Potassium Ion Selective Sensor

After EWOD chip formation was completed using the methods described in EXAMPLE 1, a potassium ion selective sensor was formed using on-chip fabrication. The following potassium ion-selective membrane solution was used: 1 wt % of potassium ionophore I, 0.5 wt %, potassium tetrakis (4-chlorophenyl) borate, 49.5 wt % bis (2-ethylhexyl) sebacate, and 49 wt % polyvinyl chloride (PVC) were dissolved in Tetrahydrofuran (THF-T397-4). All materials for the membrane solution were purchased from Sigma-Aldrich.

Figure 4:
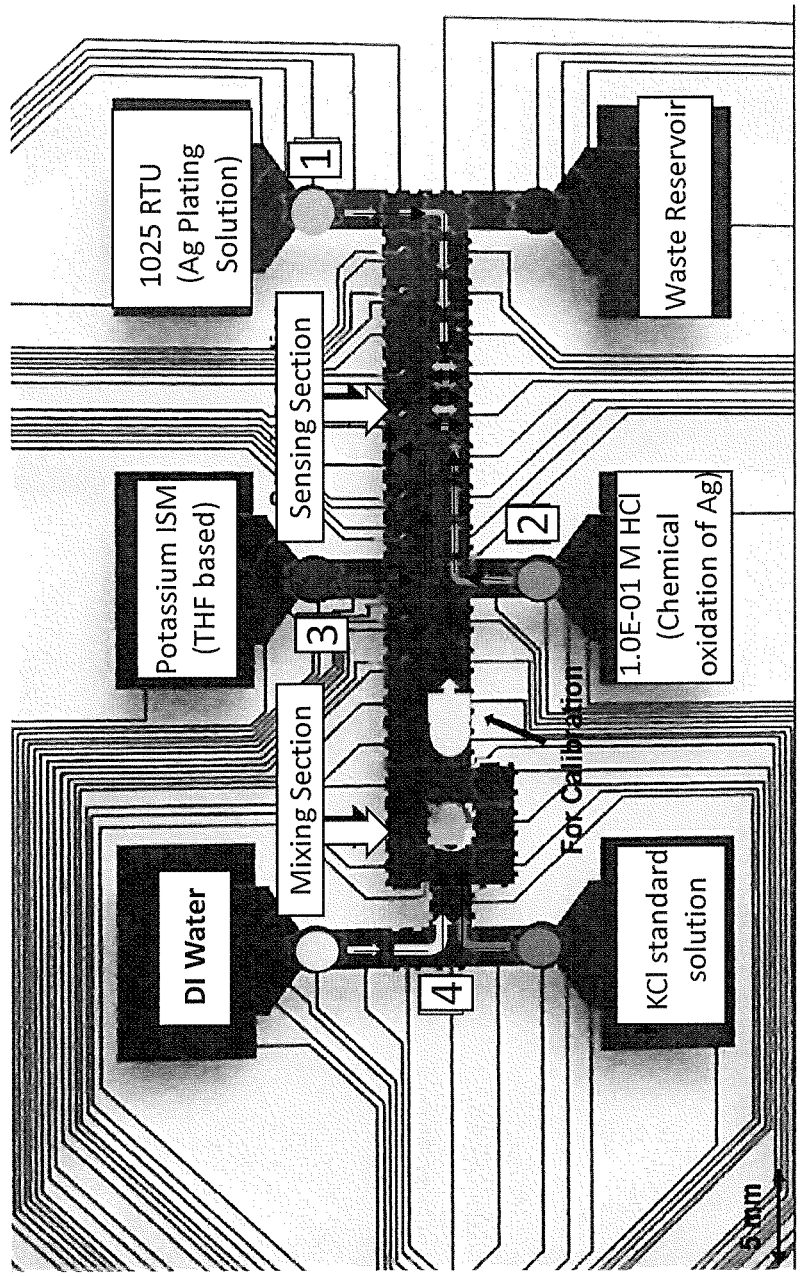
FIG. 4 is a top view of an EWOD electrochemical cell having a plurality of reservoirs from which an on-chip ion-selective electrode can be fabricated and calibrated.

After loading reagents solutions to designated reservoirs, as shown in FIG. 4, the top chip was placed to complete EWOD DMF device. FIG. 4 illustrates steps of on-chip sensor fabrication. Firstly, a droplet (~650 nL) of Ag plating solution was dispensed from the reservoir and brought over the sensor site by EWOD microfluidic actuation (Step 1). Electroplating was driven at 12 $mA/cm^2$ for 300 seconds. To avoid the depletion of silver ion, silver plating solution droplets were replenished during electroplating as needed. Similarly, a droplet of 0.1 M HCl solution was dispensed from the designated reservoir and brought over to the Ag-plated electrodes (Step 2) and applied to the surface for 45 seconds to form an AgCl layer.

Notably, the Ag/AgCl reference electrode works as a redox electrode and the equilibrium is between Ag layer and AgCl layer, the thickness of the Ag may affect the lifetime of the sensor, but it has nothing to do with the stability of potential measurement during sensing.

Figure 6:
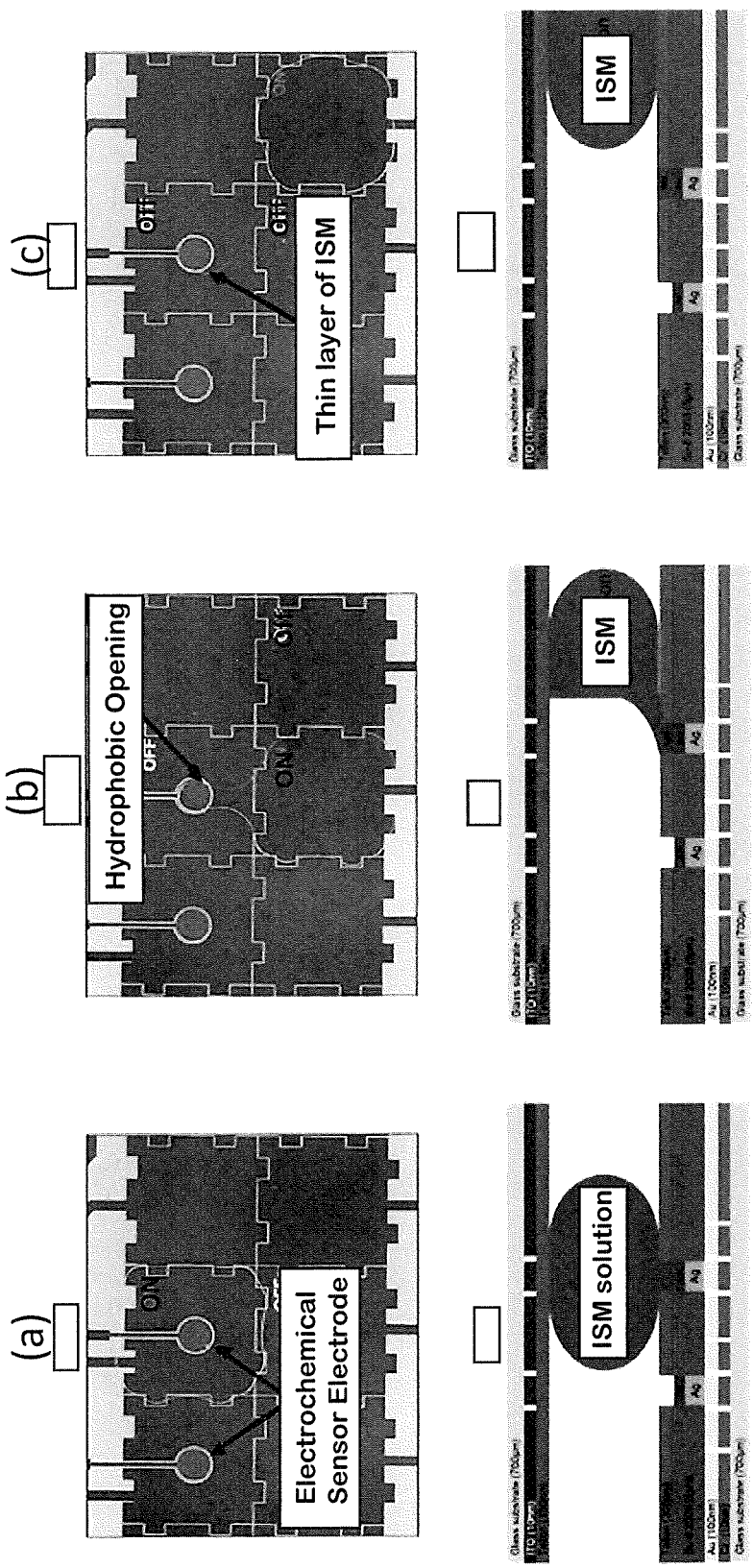
FIG. 6 shows movement of an ion selective membrane solution droplet driven to a sensor electrode by EWOD motion; and the pinching-off mechanism of the droplet.

Lastly, a droplet was dispensed from the membrane solution reservoir and brought over to a sensor electrode to faun the layer of potassium-selective membrane (Step 3). Due to the wettability contrast, the membrane solution was pinched-off at the hydrophilic opening of the sensor electrode and left a tiny portion of it on the sensor electrode (FIG. 6). After the evaporation of THF, the solvent of the membrane solution, a thin layer of the potassium-selective membrane was formed over one of the sensor electrodes.

Regarding sample preparation, although serial dilution step of the sample solution can be used for on-chip calibration (Step 4), here all the solutions required for the calibration process were prepared off-chip to avoid any possible errors caused by on-chip serial dilution.

Figure 5:
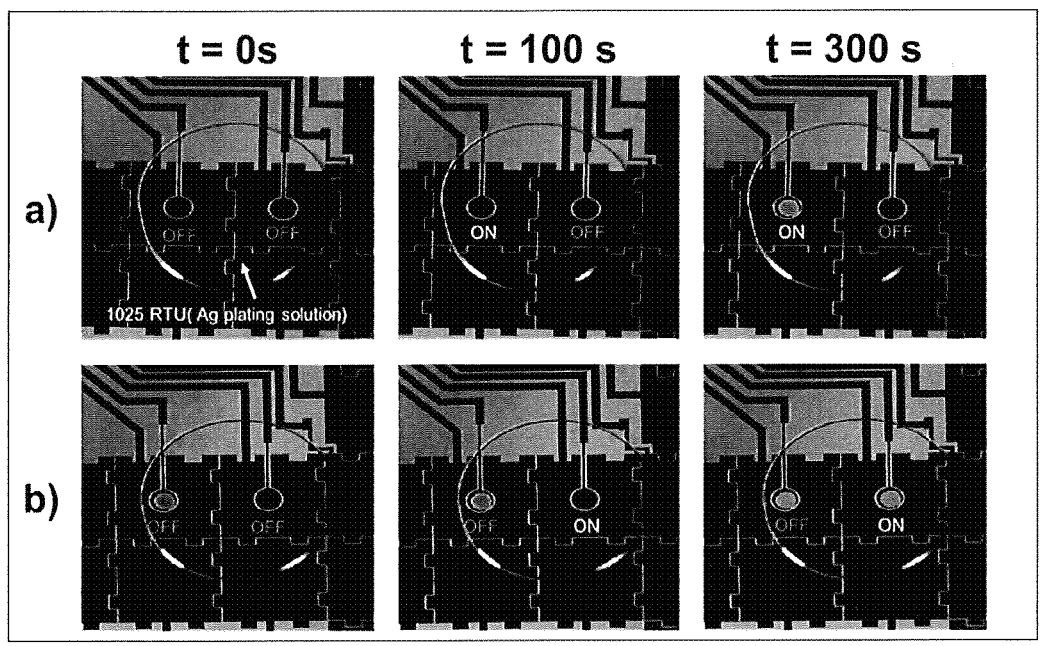
FIG. 5 is a sequence of pictures showing on-chip electroplating of Ag sensor electrodes, where row (a) shows Ag deposition on the left sensor electrode, and row (b) shows Ag deposition on the right sensor electrode.

On this DMF platform, the solid Ag/AgCl reference electrodes were fabricated through electroplating followed by chemical oxidation of the electroplated layer. This method requires the sensor electrodes to be exposed to solutions, unlike the EWOD electrode on which a dielectric layer is necessary for charge polarization and changing the surface energy. While chip design and fabrication processes were optimized, severe edge effect was observed during the on-chip electroplating process. When entire sensor electrodes were exposed to the plating solution, the edges of electrode experience high electric field densities compare to the center part. This resulted in the much faster Ag deposition rate along the edge of an electrode so that the plated Ag layer became highly non-uniform. This problem was solved by patterning the dielectric layer to cover edges of a sensor electrode. With the optimized design, successful on-chip electroplating of Ag was achieved as shown in FIG. 5. FIG. 5 shows on-chip electroplating of Ag sensor electrodes, where row (a) shows Ag deposition on the left sensor electrode, and row (b) shows Ag deposition on the right sensor electrode.

Tetrahydrofuran (THF) has been used as a solvent for dissolving potassium ion selective membrane (ISM) components, but here, THF was also used as a carrier fluid to move the membrane solution on the EWOD DMF platform. THF as an insulating fluid is only movable at low frequencies compared to other liquids. Usually, ISM cocktail components are dissolved in THF with the weight ratio of (1:10), then the mixture poured over the designated area and let the THF evaporate to form a gel-like membrane. However, this ratio makes ISM solution highly viscous and significantly hinders ISM solution droplet movability in EWOD device. To overcome the viscosity issue, a (1:15) ratio was used to enhance movability and pinching off process shown in FIG. 6 while compensating the amount of THF evaporated during the on-chip fabrication process. In some embodiments a 1:17, 1:19, 1:20, 1:22, 1:24, 1:25 or higher ratio can be used. FIG. 6 shows top view images and a cross-sectional side view illustration of ISM solution pinching-off process. In row (a), an ISM solution droplet was brought over a sensor electrode by EWOD motion, in row (b) the ISM solution droplet was being driven away from the sensor electrode while a part of ISM solution is wetting the hydrophilic opening over the electrode, and in row (c) a thin layer of ISM remains on the sensor electrode after the completion of pinch-off and evaporating the solvent (THF).

The thickness of the ISM is correlated to the volume of the pinched-off ISM solution over sensor electrodes, which is controlled by the area and geometry of the hydrophilic opening. Small variations in volume were inevitable, but resulted in negligible variation in thickness of ISM. This might lead to minor changes in response time, but no significant effect on the electromotive force (EMF) measurement at the equilibrium.

Example 3

Calibration of a Potassium Ion Selective Sensor

To calibrate the potassium ion selective sensor prepared in EXAMPLE 2, eight different molarities of the potassium chloride (KCl) solution (1 µM-1M) were prepared by the serial dilution of 1M stock solution. The 1M stock solution was prepared by dissolving KCl powder (Sigma-Aldrich) in deionized water.

Each of the potassium chloride solutions were dispensed to a sample reservoir one at a time in an EWOD device prepared according to EXAMPLE 1 and 2. Then droplets of each molarity were brought over the on-chip fabricated potassium ion-selective electrode, and electromotive force (EMF) was measured with a high input impedance (~$10^{12}\Omega$) by HP 34401A Multimeter at room temperature (21° C.). This experiment was repeated 3 times to ensure the reproducibility of data, and activity coefficients of the potassium ion in each sample were calculated from the concentration of potassium ion, its ionic strength in presence of chloride ion. It was observed that EMF output from each sensor is well stabilized within 250 s. To validate the sensor, the slope Nernstian response of the fabricated sensor was compared with the theoretical value. The EMF averaged data at t=210 s were then plotted to calibrate the sensor. The plot had a slope of 58 mV/log which is within the acceptable range (57-59 mV/log) for a successful potassium ion selective sensor according to the theory of potentiometric sensors. The integration of potassium ion selective potentiometric sensor with EWOD microfluidic platforms was thusly confirmed to be operational.

In EXAMPLES 1-3, an EWOD-electrochemical cell chip was designed, fabricated and used as a microfluidic platform to introduce "on-chip" electroplating and chemical oxidation to fabricate the Ag/AgCl electrodes needed for potentiometric measurements. On-chip fabrication of ion-selective electrode also included the formation of potassium ion selective membrane over one of the electrodes. Finally, the calibration curve of EMF measurement from fabricated sensors against eight different molarities of KCl solutions was obtained. The slope of 58 mV/dec of the calibration curve was achieved and was in agreement with the theoretical value. The devices and methods described herein can address the challenge of the potentiometric sensor by adding lifetime to sensor electrodes while adding a reliable and reproducible analysis unit to lab-on-a-chip devices. The on-chip fabrication of Ag/AgCl provides a method of restoring reference electrodes after their original lifetime, while the on-chip formation of the ion selective membrane demonstrates on-demand fabrication (i.e., reconfiguration) for assessing arbitrary assays using the same platform. This method of fabrication can in some instances provide low cost and compatible home-use sensors with the benefits of EWOD, such as ease of use, automation, and minimal consumption of reagents.

Example 4

On-Chip Fabrication of a Potassium, Sodium, and Calcium Ion Selective Sensors

An EWOD device was prepared that had multiple potentiometric ion selective sensors, forming an Ion Selective Sensor Assay. Specifically, potentiometric sensors selective for potassium ($K^+$), a sodium ($Na^+$), and a calcium ($Ca^{2+}$) were formed on the EWOD device. These ions together form a basic metabolic panel (BMP) that are routinely monitored in patients to assess the patient's overall health. The current state of the art for BMP testing requires blood sample collection in a lab by a certified phlebotomist and lab analysis by a technician. This process is time-consuming and expensive, and needless to say, uncomfortable for daily health monitoring. Additionally, this multi-sided process makes it difficult to establish a cohesive database for BMP of the patient's blood.

In an aspect, a LOC is described herein that only needs a droplet (5-7 µL) of the sample for simultaneous concentration measurement potassium ($K^+$), sodium ($Na^+$), and calcium ($Ca^{2+}$) with help of an solid state electrochemical potentiometric assay. Fabrication and calibration of the potassium selective electrode was previously described in EXAMPLE 2, so here the fabrication and calibration of calcium and sodium selective electrodes are described. The method follows the similar method described for the potassium ion selective sensor. After acquiring a calibration curve, simultaneous measurement of ion concentrations was conducted on an emulated human blood plasma solution for addressing the capability of the solid-state electrochemical assay.

An EWOD chip fabrication was completed using the methods described in EXAMPLE 1. A potassium ($K^+$), a sodium (Na$^+$), and a calcium (Ca$^{2+}$) ion selective sensor were each then formed on the EWOD device using on-chip fabrication, using the method described in EXAMPLE 2. The composition of the ion selective membranes were as follows.

For sodium ion selective membrane: 10 wt % of Sodium ionophore I, 0.5 wt %, Sodium tetraphenylborate, and 89.5 wt % 2-Nitrophenyl octyl ether.

For calcium ion selective membrane, a membrane cocktail was purchased from Sigma Aldrich with the following composition: 1 wt % of Calcium ionophore IV, 0.022 wt %, of potassium tetrakis (4-chlorophenyl) borate, 4.748 wt % of 2-Nitrophenyl octyl ether, 2.379 wt % of polyvinyl chloride (PVC), and 92.78 wt % of Tetrahydrofuran.

For the potassium ion-selective membrane solution, 1 wt % of potassium ionophore I, 0.5 wt %, potassium tetrakis (4-chlorophenyl) borate, 49.5 wt % bis (2-ethylhexyl) sebacate, and 49 wt % polyvinyl chloride (PVC) were dissolved in Tetrahydrofuran.

For calibration of the sodium and calcium selective sensors, six different molarities of the sodium chloride (NaCl) and calcium chloride (CaCl$_2$) solutions (1 µM-1M) were prepared by the serial dilution of 1 M stock solution. The stock solutions were prepared by dissolving NaCl and CaCl$_2$ powders in deionized water.

For the sodium selective sensor, droplets (3 µl) of each molarity were dispensed over the fabricated sodium ion-selective electrode, and EMF was measured with a high input impedance (~$10^{12}\Omega$) by HP 34401A Multimeter at room temperature (23° C.). This experiment was repeated 3 times to ensure the reproducibility of data. The activity coefficient of sodium ions in each sample were calculated from the concentration of sodium ion, and its ionic strength in the presence of chloride ion. The slope of the experimental calibration data matched the reported slope provided by Sigma Aldrich for the sodium ion selective membrane. The detection limit was determined to have limited coverage from $10^{-3}$ to $10^{-6}$ M. These results show that the sodium selective sensor can be used for measuring the sodium ion concentration in the human blood due to the compatibility of the range of sodium ion in human blood being within the sensor's detection limits.

For the calcium selective sensor, droplets (3 µl) of each molarity were dispensed over the fabricated calcium ion-selective electrode, and EMF was measured with a high input impedance (~$10^{12}\Omega$) by HP 34401A Multimeter at room temperature (23° C.). This experiment was repeated 3 times to ensure the reproducibility of data. The activity coefficients of the calcium ion in each sample were calculated from the concentration of calcium ion, and its ionic strength in presence of chloride ion. To validate the sensor, the slope Nernstian response of the fabricated sensor was compared with the theoretical value, where EMF averaged data at t=30 s were plotted to calibrate the sensor. The plot has a slope of 21 mV/log which is within the acceptable range (21-23 mV/log) for a successful calcium ion selective sensor according to the theory of potentiometric sensor.

Example 5

Simultaneous Measurement Multiple Ions Via EWOD Chip

In this EXAMPLE, the EWOD device prepared in EXAMPLE 4 was prepared and calibrated according to EXAMPLES 3 and 4. An anemulated human blood plasma solution was prepared to demonstrate the feasibility of using the EWOD device in an electrolyte assay. The concentrations of Ca$^{2+}$, Na$^+$, and K$^+$ ions in the electrolyte were prepared based on the range of concentration of these ions in the human blood. Therefore, a mixed solution with 1.4E-01 M Na$^+$, 2.0E-03 M Ca$^{2+}$ and 3.5E-03 M K$^+$ was used as the anemulated human blood plasma solution.

Figure 7:
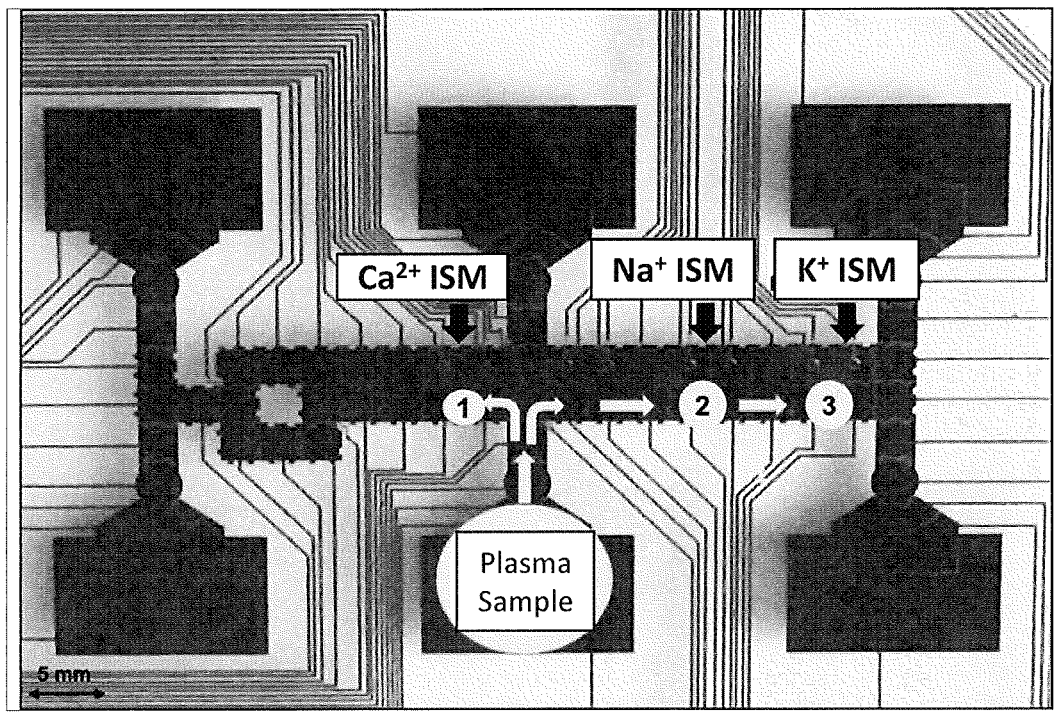
FIG. 7 is an EWOD DMF having calcium, sodium, and potassium ion selective sensors.

FIG. 7 shows the EWOD device having the calcium, potassium, and sodium ion selective sensors. A droplet (7 µl) of the anemulated human blood plasma solution placed over one of the EWOD chip reservoirs; then three smaller droplets were dispensed from the reservoir and brought over the fabricated ion selective sensors via EWOD actuation. Then the EMF was measured simultaneously for each sensor. The measured concentrations of K$^+$, Na$^+$, and Ca$^{2+}$ in the plasma solution agreed with the known amount of ions in the sample, with the error percentages for K$^+$, Na$^+$ and Ca$^{2+}$ being 0.28%, 2.85% and 2.5% respectively.

The described lab on a chip (LOC) in this EXAMPLE has a sample volume required for the measurements of the concentration of K$^+$, Na$^+$, and Ca$^{2+}$ on the order of 10 microliters compared to conventional methods which is in order of tens of milliliter, resulting in a massive reduction in reagent consumption and cost of screening. Additionally, the capability of the proposed EWOD microfluidic system in the handling of nanoliter-scale reduced the necessary blood sample amount for each test and offers the benefit of transitioning these blood tests from being a vein acquisition to fingertip acquisition. This offers the benefit of eliminating blood vein acquisition problems in elderly and young patients.

Capability of simultaneous measurement and automation in LOC can minimize the common human error involved with healthcare diagnostic processes and drastically reduce time required for analysis. Additionally, the affordability of the test conducted by the described devices can have a significant impact on dietary adjustments in patients since the BMP monitoring can happen more frequently and the result can be recorded for comprehensive analysis throughout the patient's lifetime.

The invention claimed is:

1. An electrowetting-on-dielectric (EWOD) microfluidic device comprising at least one integrated electrochemical sensor, wherein:
   the at least one integrated electrochemical sensor comprises:
      a reference electrode;
      a sensing electrode; and
      an analyte-selective layer positioned over the sensing electrode;
   the device comprises a first parallel plate;
   the first parallel plate comprises a first substrate, a first set of one or more electrowetting electrodes positioned over the first substrate, and a first dielectric layer positioned over the first set of one or more electrowetting electrodes and the first substrate;
   the reference electrode and the sensing electrode are embedded within the first dielectric layer but are not covered by the first dielectric layer;
   the reference electrode and the sensing electrode are in electrical communication with the first set of one or more electrowetting electrodes of the first parallel plate;
   a first hydrophobic coating is positioned over the first dielectric layer;
   the reference electrode is disposed in a reference electrode borehole extending through the first dielectric layer and the first hydrophobic coating to the first set of one or more electrowetting electrodes positioned over the first substrate; and the sensing electrode is disposed in a sensing electrode borehole extending through the first dielectric layer and the first hydrophobic coating to the first set of one or more electrowetting electrodes positioned over the first substrate.

2. The device of claim 1, wherein:

the reference electrode and the sensing electrode are disposed over an electrowetting electrode of the EWOD device;

a top surface of the reference electrode is exposed to a fluid disposed on the electrowetting electrode of the EWOD device; and a top surface of the analyte-selective layer is exposed to the fluid disposed on the electrowetting electrode of the EWOD device.

3. The device of claim 1, wherein the at least one integrated electrochemical sensor is an ion sensor.

4. The device of claim 3, wherein the at least one integrated electrochemical sensor is a potentiometric sensor.

5. The device of claim 4, wherein the at least one integrated electrochemical sensor measures a concentration of an analyte in a fluid sample exposed to the at least one integrated electrochemical sensor based on a potential difference between the reference electrode and the sensing electrode.

6. The device of claim 1, wherein the reference electrode comprises a silver chloride (Ag/AgCl), a calomel (Hg/$Hg_2Cl_2$), an iridium/iridium oxide (Ir/$IrO_2$), a mercury/mercury oxide (Hg/HgO), a mercury/mercurous sulfate (Hg/$Hg_2SO_4$), or a copper/copper(II) sulfate (Cu/$CuSO_4$) electrode.

7. The device of claim 1, wherein the sensing electrode comprises an electrode member made from a conductive metal or metal alloy, and the analyte-selective layer is positioned over and in direct contact with the electrode member.

8. The device of claim 1, wherein the analyte-selective layer is a glass membrane, a resin membrane, or a polymeric membrane.

9. The device of claim 1, wherein the analyte-selective layer comprises an ion selective membrane.

10. The device of claim 9, wherein the ion selective membrane comprises an ionophore.

11. The device of claim 10, wherein the ionophore is beauvericin, calcimycine cezomycin, carbonyl cyanide m-chlorophenyl hydrazine, enniatin, gramicidin a, ionomycin, lasalocid, monensin, nigericin, nonactin, salinomycin, tetronasin, valinomycin, or narasin.

12. The device of claim 10, wherein the ion selective membrane comprises a polymer.

13. The device of claim 1, wherein:

the first substrate is formed from a glass, a silicon, a plastic, a polymer, or a paper;

the first set of one or more electrowetting electrodes positioned over the first substrate are formed from a metal or metal alloy;

the first dielectric layer is formed from a dielectric material; and the first hydrophobic coating is formed from a polyfluorinated hydrocarbon.

14. The device of claim 1 further comprising:

a second parallel plate in facing opposition to the first parallel plate; and a gap between the first and second parallel plates.

15. The device of claim 14, wherein:

the second parallel plate comprises a second substrate, a second set of one or more electrowetting electrodes positioned over the second substrate, and a second dielectric layer positioned over the second set of one or more electrowetting electrodes and the second substrate.

16. The device of claim 15, wherein:

the second substrate is formed from a glass, a silicon, a plastic, a polymer, or a paper;

the second set of one or more electrowetting electrodes is formed from a metal or metal alloy; and the second dielectric layer is formed from a polyfluorinated hydrocarbon.

17. The device of claim 1, wherein the device comprises a plurality of integrated electrochemical sensors.

18. The device of claim 17, wherein:

the device comprises a first electrochemical sensor including a first analyte-selective layer that is selective for a first analyte;

the device comprises a second electrochemical sensor including a second analyte-selective layer that is selective for a second analyte; and the first analyte and the second analyte differ.

19. The device of claim 18, wherein the first analyte and the second analyte are selected from a group consisting of $K^+$, $Na^+$, $Ca^{2+}$, $HCO_3^-$, $Mg^{2+}$, $H^+$, $Ba^{2+}$, $Pb^{2+}$, $Cu^{2+}$, $I^-$, $NH_4^+$, and $(SO4)^{2-}$.

* * * * *